UNITED STATES PATENT OFFICE.

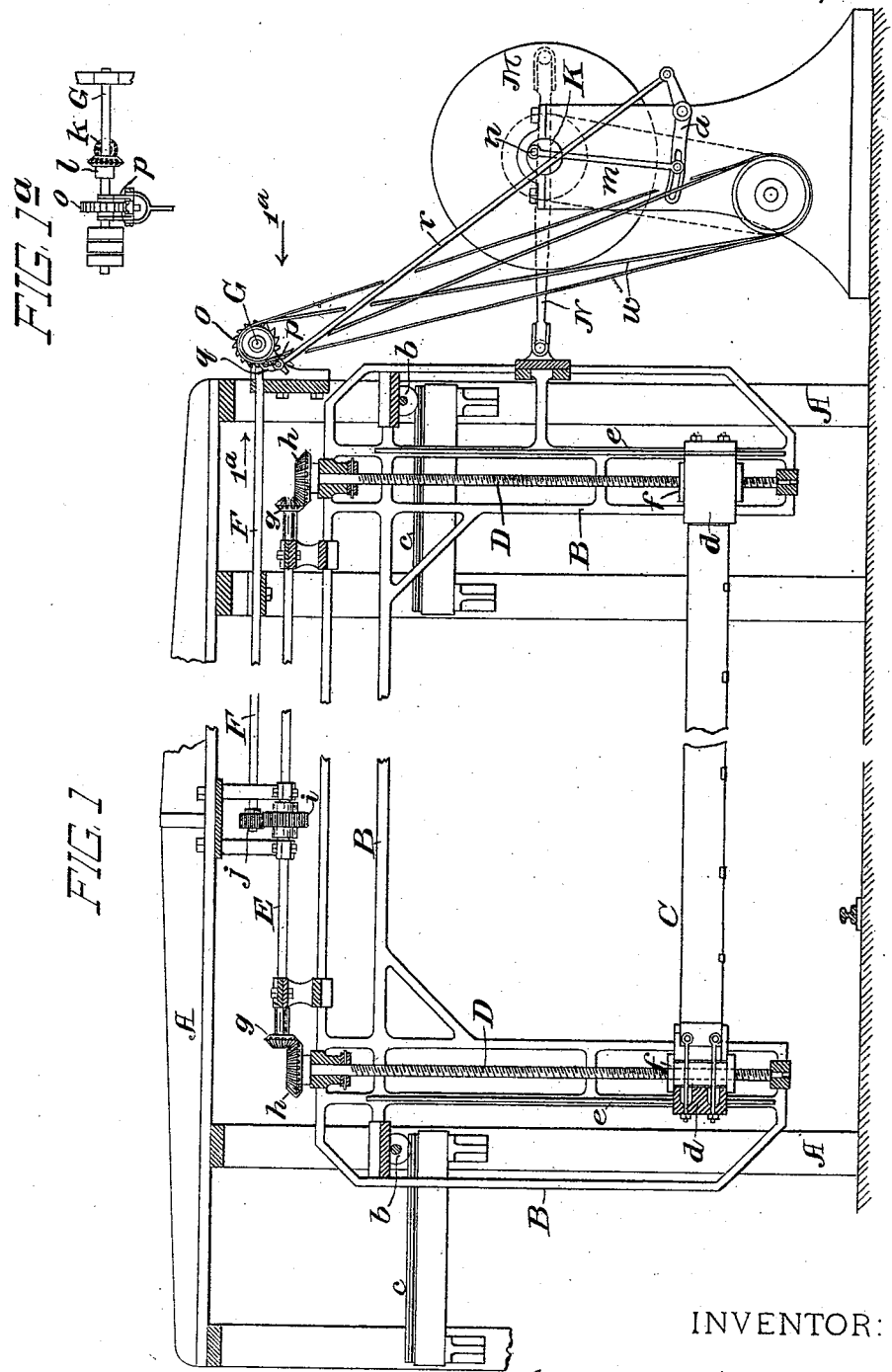

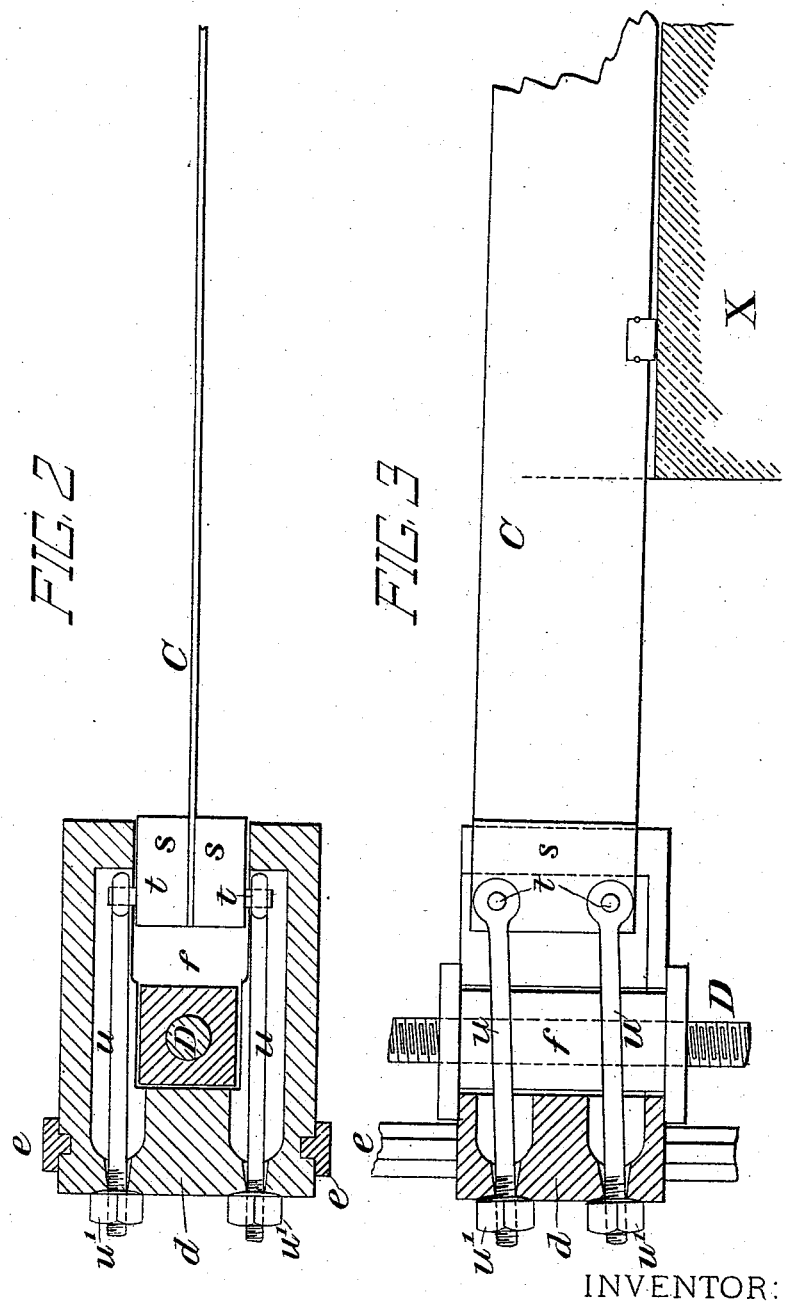

GEORGE N. WILLIAMS, JR., OF NEW YORK, N. Y., ASSIGNOR OF ONE-HALF TO BENJAMIN A. WILLIAMS, OF SAME PLACE.

METHOD OF OPERATING DIAMOND STONE-SAWING MACHINES.

SPECIFICATION forming part of Letters Patent No. 490,464, dated January 24, 1893.

Application filed March 7, 1892. Serial No. 423,978. (No model.)

*To all whom it may concern:*

Be it known that I, GEORGE N. WILLIAMS, Jr., a citizen of the United States, and a resident of the city, county, and State of New York, have invented certain Improvements in Methods of Operating Diamond Stone-Sawing Machines, of which the following is a specification.

My invention relates to a mode of operating a diamond stone sawing machine of the kind wherein the saw or saw-blade is fed to the stone during the cutting operation; and it consists, essentially, in the employment of a feed for the blade which combines to some extent a positive feed,—as a screw feed for example,—and a spring pressure feed, resulting from the reaction of the saw-blade put under undue tension by the accumulation of feed obtained from the feed screws, as will be more particularly described hereinafter.

Diamond stone sawing machines wherein the saw is fed to the stone, as now used, vary somewhat in detail, but all are constructed on the same general principles, so far as I am aware, and are too well known to require here more than a brief general description. The saw or saw-blade, set with diamonds or borts, is strained in a heavy sash, in the manner of a bow-string, being coupled at its extremities by long straining links or bolts, to blocks which are mounted to slide up and down in guides in the sash. The positive feed is imparted to the saw by means of two screws which screw through nuts mounted in the respective sliding blocks, said screws having collared bearings in the sash. The sash is reciprocated on horizontal guides or tracks on the frame of the machine by means of a crank and connecting-rod, and the screws are rotated in a manner to feed the saw to the stone, by means of a ratchet and suitable gearing.

I have described above the ordinary and well known "Young" machine, omitting some of the accessories usually employed on this machine. In the "Young" machine, as well as in others of its class, the saw or saw-blade, being strained longitudinally and coupled at its ends to the sliding blocks by straining bolts or links, may be pressed either upward or downward to a slight or moderate extent, if sufficient pressure be applied at the points where said links are coupled to it, and when said pressure shall have been removed the saw will return to its normal position by its own resiliency or spring. Advantage has been taken of this elastic or spring reaction to press down the saw during one stroke by a device known as a "lift," and permit it to rise and clear itself on the return stroke by the removal of pressure imparted by the lift.

In carrying out my invention I impart a positive feed to the saw during one stroke in excess of what is required for the cut on that stroke, and the effect of this mode of operation is to feed down the blocks between which the saw is strained to a somewhat greater extent than that due to the cutting power of the saw, and consequently the saw will be upheld by the stone to a slight extent at the termination of said stroke, and will press down upon the stone in its effort to attain its normal position. On the return stroke, the positive feed is not operated and this spring pressure of the saw will cause it to cut and feed itself to the stone during this stroke, whereby, at the termination of the return stroke, the saw will have cut its way into the stone far enough to enable it to resume its normal position. This operation will be repeated at each complete reciprocating movement of the saw, the positive feed operating only on one stroke and storing up or accumulating, during this stroke, through the resiliency of the saw and its mountings, the necessary feed to enable it to cut on the return stroke. The action on the saw and its mountings, by the positive feed, is similar to that of compressing a spring, which, when compressed tends to assume its normal condition of tension; and the cutting away of the stone on the return stroke of the saw corresponds to the removal of the abutment against which the spring is compressed. The amount of positive feed applied to the saw should not, of course, exceed twice that which the saw will cut of the particular stone being sawed, during one stroke, and it may be less than twice that amount. This is a matter within the experience and skill of the sawyer.

In order that my invention may be the better understood I have shown in the accompanying drawings a diamond stone sawing machine with which my method of operating the saw may be carried out. This machine is constructed in substantially the same manner as the well known "Young" machine.

Figure 1 is a vertical, longitudinal section of the machine as a whole; and Fig. 1ª is an end view of the upper part of the machine taken from the point indicated by arrow 1ª in Fig. 1. Figs. 2 and 3 are detached detail views on a larger scale, illustrating the means for straining the saw between the sliding blocks in the sash.

A represents the frame of the saw, B the reciprocating sash, provided with rollers $b$, which roll on tracks $c$ on the frame, as the sash is reciprocated.

K is the driving shaft, in which is a crank M, to the crank-pin of which is coupled the connecting rod N, which imparts the proper motion to the sash B.

Mounted in bearings at the respective ends of the sash are the feed-screws D, which impart the positive feed to the saw C. These screws pass each through a nut $f$ in a sliding block $d$, mounted in upright guides $e$, on the sash B; between these blocks the saw C is strained in a manner that will be described more in detail hereinafter.

In order to impart rotation to the feed-screws D to an equal extent and simultaneously, during one stroke of the saw, the usual mechanism may be employed; this comprises a horizontal shaft E, mounted in bearings on the sash and having on each end a bevel wheel $g$, which gears with a bevel wheel $h$, on the screw D. On the shaft E is splined a toothed wheel $i$, which is collared on the frame A and gears with a wheel $j$, on a shaft F, mounted on the main frame. On the shaft F is a bevel wheel $k$ (see Fig. 1ª) which gears with a bevel wheel $l$, on a cross-shaft G, mounted in brackets on the end of the frame. On the shaft G is the feed ratchet wheel $o$, to which motion is imparted during one stroke of the machine by a pawl $q$, on a pawl arm $p$ which swings radially about the shaft G. This pawl arm is operated by a rod $r$, which is coupled at its lower end to one arm of a pivoted rocker $a$, the other arm of which is coupled by a connecting rod $m$, to a crank $n$, on the driving shaft K. As the shaft K revolves, its crank $n$ imparts a vibrating motion to the rocker $a$, and this is communicated to the pawl arm $p$ and pawl $q$, whereby, during one stroke of the saw the feed screws are operated by the ratchet wheel through the intermediate gearing; but on the return stroke the pawl will recede and the ratchet wheel will remain stationary.

The extent of the feed of the saw will be governed by several factors, namely, the pitch of the screws, the diameter of the ratchet wheel, the diameters of the intermediate gear wheels, the throw of the crank $n$, and the lengths of the respective arms of the rocker $a$. It will be obvious to any competent mechanic that the extent of the feed may be varied by varying either of these factors; but the proportions of the several parts named will preferably be such as to feed the saw to about the normal extent during the stroke, and any variation from this feed may be made by providing a slotted connection of the rod $m$ with the arm of the rocker $a$, as represented in Fig. 1, this will enable the coupling point of the said rod $m$ to the rocker $a$, to be set farther from or nearer to the fulcrum of the rocker, as described.

Figs. 2 and 3 illustrate one mode of securing the saw-blade C at its respective ends to the sliding blocks $d$ in the sash. Fig. 2 is a horizontal section in the plane indicated by line 2, 2, in Fig. 3, and Fig. 3 is a vertical section taken in the plane indicated by line 3, 3, in Fig. 2.

On the blade C, at its end, are secured cheek-pieces $s$, which may be riveted to the blade; and projecting from these cheek-pieces are studs $t$, two on each side of the blade. Links $u$, in the form of eye-bolts, engage the respective studs $t$, as clearly shown, their outer, screw-threaded ends passing through apertures in the outer face of the block $d$, and furnished with tightening or straining nuts, $u'$, on their projecting ends. The links $u$ permit of some upward and downward deflection of the saw-blade from a straight line, as shown in Fig. 3, wherein the parts are represented as they will appear at the end of the out stroke, the feed-screws D having pressed the blocks $d$ down to an extent in excess of that due to the power of the saw to cut the stone X. Of course the depth cut by a diamond saw at one stroke is very slight and in Fig. 3 I have exaggerated the excess of positive feed in order to show clearly the angular position of the links $u$; but there will be an appreciable amount of positive feed imparted by the screws, and if this be too great, there is danger of serious injury to the machine.

In Fig. 1, I have broken away the middle portion of the machine in order to economize space, and I have also broken away a part of the frame at the left-hand end of the machine for the same reason. These omissions, however, will not prevent a perfect understanding of the construction and operation of the machine. The pulleys on shaft G, and the belts $w$, seen at the right in Fig. 1, are employed for moving the saw C up and down conveniently and rapidly when setting a stone. This is a well-known device and has no relation to my invention.

Other forms of the straining device for the saw may be employed; that shown is like or similar to those now used on this class of diamond stone sawing machines. I would say with respect to this straining of the saw longitudinally in the reciprocating sash, that the tension on the saw is ordinarily sufficient to compel it to cut its way into the stone to a certain depth before it will yield; and the positive feed is regulated so as to advance the saw only to this extent during the stroke. Hence, at the end of the stroke, under these ordinary conditions, the saw will be in its normal position, and if no screw feed be applied on the return stroke the saw will not cut on this stroke. But by my method of operating the machine, I increase the positive feed during the one stroke beyond that due to the normal cutting power of the saw, and consequently store up a surplus of feed in the spring of the saw-attachments, which surplus is applied to feed the saw and compel it to cut on the return stroke.

Having thus described my invention, I claim:

1. The improvement in the art of sawing stone with a reciprocating saw blade set with diamonds or borts which consists in feeding said saw-blade to the stone on one stroke in a positive manner and in excess of the cutting power of the saw, and suppressing said positive feed on the return stroke, whereby the cut on said return stroke is effected through a non-positive, spring feed as set forth.

2. The improvement in the art of sawing stone with a reciprocating saw-blade set with diamonds or borts which consists in feeding said blade positively to the stone on one stroke, in excess of the cutting power of the saw and in proportion to the speed at which it is moving at all points in said stroke, and suppressing said positive feed on the return stroke, substantially as set forth.

3. The improvement in the art of sawing stone with a reciprocating saw blade provided with diamonds or borts, and strained longitudinally whereby it is free to be pressed upward to a slight extent, said improvement consisting in feeding said saw blade to the stone in a positive manner on one stroke only, whereby said blade is fed to the stone on the return stroke by its own resiliency or elasticity, as set forth.

4. In a stone sawing machine the combination with a frame, a reciprocating sash mounted therein, and a saw blade provided with diamonds or the like, strained longitudinally in said sash and free to be pressed upward to a limited extent, and means for feeding said saw blade to the stone in a positive manner on one stroke only, whereby on the return stroke the blade will be fed to the stone by its own resiliency, as set forth.

In witness whereof I have hereunto signed my name in the presence of two subscribing witnesses.

GEORGE N. WILLIAMS, JR.

Witnesses:
HENRY CONNETT,
HERBERT BLOSSOM.